(12) United States Patent
Liang

(10) Patent No.: US 6,691,211 B2
(45) Date of Patent: Feb. 10, 2004

(54) METHOD OF SELECTING REGISTERS FROM A PRIMITIVE REGISTER SET

(75) Inventor: Ching-Jer Liang, Hsinchu Hsien (TW)

(73) Assignee: Faraday Technology Corp., Hsinchu (TW)

( * ) Notice: Subject to any disclaimer, the term of this patent is extended or adjusted under 35 U.S.C. 154(b) by 374 days.

(21) Appl. No.: 09/940,393

(22) Filed: Aug. 27, 2001

(65) Prior Publication Data

US 2003/0009647 A1 Jan. 9, 2003

(51) Int. Cl.$^7$ .............................................. G06F 12/00
(52) U.S. Cl. ......................... 711/154; 711/6; 711/101; 711/203; 711/208; 712/43; 712/219
(58) Field of Search ........................ 711/6, 203, 208, 711/101, 154; 712/43, 219

(56) References Cited

U.S. PATENT DOCUMENTS 5,434,972 A * 7/1995 Hamlin ....................... 709/238
5,857,183 A * 1/1999 Kableshkov .................... 707/3
6,499,076 B2 * 12/2002 Date et al. ................... 710/113
6,499,123 B1 * 12/2002 McFarland et al. .......... 714/724

* cited by examiner

Primary Examiner—T. Nguyen
(74) Attorney, Agent, or Firm—J. C. Patents

(57) ABSTRACT

A method of selecting registers is proposed, which is used to gain access to a register in a primitive register set which is used to provide a plurality of physical registers, virtual registers, physical program counters, and virtual program counters arranged into six modes. The primitive register set is first mapped to a converted register set which contains only two modes of registers that are mapped to the six modes of registers in the primitive register set. The access to the primitive register set is carried out by a bit sequence. If Converted Mode 0 in the converted register set is selected, the selection is mapped to one of the physical registers and physical program counter in the Converted Mode 0; and if Converted Mode 1 is selected, the selection is mapped to one of the virtual registers and virtual program counter in the Converted Mode 1.

5 Claims, 4 Drawing Sheets

| Mode 0 | Mode 1 | Mode 2 | Mode 3 | Mode 4 | Mode 5 |
|---|---|---|---|---|---|
| $R_0$ | $R_0$ | $R_0$ | $R_0$ | $R_0$ | $R_0$ |
| $R_1$ | $R_1$ | $R_1$ | $R_1$ | $R_1$ | $R_1$ |
| $R_2$ | $R_2$ | $R_2$ | $R_2$ | $R_2$ | $R_2$ |
| $R_3$ | $R_3$ | $R_3$ | $R_3$ | $R_3$ | $R_3$ |
| $R_4$ | $R_4$ | $R_4$ | $R_4$ | $R_4$ | $R_4$ |
| $R_5$ | $R_5$ | $R_5$ | $R_5$ | $R_5$ | $R_5$ |
| $R_6$ | $R_6$ | $R_6$ | $R_6$ | $R_6$ | $R_6$ |
| $R_7$ | $R_7$ | $R_7$ | $R_7$ | $R_7$ | $R_7$ |
| $R_8$ | $R_8$ | $R_8$ | $R_8$ | $R_8$ | $R_8\_FIQ$ |
| $R_9$ | $R_9$ | $R_9$ | $R_9$ | $R_9$ | $R_9\_FIQ$ |
| $R_{10}$ | $R_{10}$ | $R_{10}$ | $R_{10}$ | $R_{10}$ | $R_{10}\_FIQ$ |
| $R_{11}$ | $R_{11}$ | $R_{11}$ | $R_{11}$ | $R_{11}$ | $R_{11}\_FIQ$ |
| $R_{12}$ | $R_{12}$ | $R_{12}$ | $R_{12}$ | $R_{12}$ | $R_{12}\_FIQ$ |
| $R_{13}$ | $R_{13}\_SVC$ | $R_{13}\_ABORT$ | $R_{13}\_UNDEF$ | $R_{13}\_IRQ$ | $R_{13}\_FIQ$ |
| $R_{14}$ | $R_{14}\_SVC$ | $R_{14}\_ABORT$ | $R_{14}\_UNDEF$ | $R_{14}\_IRQ$ | $R_{14}\_FIQ$ |
| PC | PC | PC | PC | PC | PC |

| Mode 0 | Mode 1 | Mode 2 | Mode 3 | Mode 4 | Mode 5 |
|--------|--------|--------|--------|--------|--------|
| $R_0$ | $R_0$ | $R_0$ | $R_0$ | $R_0$ | $R_0$ |
| $R_1$ | $R_1$ | $R_1$ | $R_1$ | $R_1$ | $R_1$ |
| $R_2$ | $R_2$ | $R_2$ | $R_2$ | $R_2$ | $R_2$ |
| $R_3$ | $R_3$ | $R_3$ | $R_3$ | $R_3$ | $R_3$ |
| $R_4$ | $R_4$ | $R_4$ | $R_4$ | $R_4$ | $R_4$ |
| $R_5$ | $R_5$ | $R_5$ | $R_5$ | $R_5$ | $R_5$ |
| $R_6$ | $R_6$ | $R_6$ | $R_6$ | $R_6$ | $R_6$ |
| $R_7$ | $R_7$ | $R_7$ | $R_7$ | $R_7$ | $R_7$ |
| $R_8$ | $R_8$ | $R_8$ | $R_8$ | $R_8$ | $R_8\_FIQ$ |
| $R_9$ | $R_9$ | $R_9$ | $R_9$ | $R_9$ | $R_9\_FIQ$ |
| $R_{10}$ | $R_{10}$ | $R_{10}$ | $R_{10}$ | $R_{10}$ | $R_{10}\_FIQ$ |
| $R_{11}$ | $R_{11}$ | $R_{11}$ | $R_{11}$ | $R_{11}$ | $R_{11}\_FIQ$ |
| $R_{12}$ | $R_{12}$ | $R_{12}$ | $R_{12}$ | $R_{12}$ | $R_{12}\_FIQ$ |
| $R_{13}$ | $R_{13}\_SVC$ | $R_{13}\_ABORT$ | $R_{13}\_UNDEF$ | $R_{13}\_IRQ$ | $R_{13}\_FIQ$ |
| $R_{14}$ | $R_{14}\_SVC$ | $R_{14}\_ABORT$ | $R_{14}\_UNDEF$ | $R_{14}\_IRQ$ | $R_{14}\_FIQ$ |
| PC | PC | PC | PC | PC | PC |

FIG. 1

| Converted Mode 0 | Converted Mode 1 |
|---|---|
| $R_0$ | $R_{13}\_SVC$ |
| $R_1$ | $R_{14}\_SVC$ |
| $R_2$ | $R_{13}\_ABORT$ |
| $R_3$ | $R_{14}\_ABORT$ |
| $R_4$ | $R_{13}\_UNDEF$ |
| $R_5$ | $R_{14}\_UNDEF$ |
| $R_6$ | $R_{13}\_IRQ$ |
| $R_7$ | $R_{14}\_IRQ$ |
| $R_8$ | $R_8\_FIQ$ |
| $R_9$ | $R_9\_FIQ$ |
| $R_{10}$ | $R_{10}\_FIQ$ |
| $R_{11}$ | $R_{11}\_FIQ$ |
| $R_{12}$ | $R_{12}\_FIQ$ |
| $R_{13}$ | $R_{13}\_FIQ$ |
| $R_{14}$ | $R_{14}\_FIQ$ |
| PC | PC |

FIG. 4

METHOD OF SELECTING REGISTERS FROM A PRIMITIVE REGISTER SET

BACKGROUND OF THE INVENTION

1. Field of the Invention

This invention relates to computer technology, and more particularly, to a method of selecting registers.

2. Description of Related Art

FIG. 1 shows a conventional architecture of a primitive register set. As shown, the primitive register set includes six modes: Mode 0, Mode 1, Mode 2, Mode 3, Mode 4, and Mode 5; wherein Mode 0 includes 15 physical registers R0–R14 and one physical program counter PC; Mode 1 includes 13 virtual registers R0–R12, two physical registers R13_SVC, R14_SVC, and one virtual program counter PC; Mode 2 includes 13 virtual registers R0–R12, two physical registers R13_ABORT, R14_ABORT, and one virtual program counter PC; Mode 3 includes 13 virtual registers R0–R12, two physical registers R13_UNDEF, R14_UNDEF, and one virtual program counter PC; Mode 4 includes 13 virtual registers R0–R12, two physical registers R13_IRQ, R14_IRQ, and one virtual program counter PC; Mode 5 includes 8 of virtual registers R0–R7, 7 physical registers R8_FIQ–R14_FIQ, and one virtual program counter PC.

To gain access to one of the registers shown in FIG. 1, it requires the use of 3 bits for mode selection and another 4 bits for register selection. For example, when it is desired to gain access to (Mode 2, R7), it is required to use (010) to select Mode 2 and then use (0111) to select the register R7 in Mode 2. However, since R7 in Mode 2 is a virtual register, the access will be then redirected to the physical register R7 in Mode 0. This operation would result in the use of redundant bits and a slower access speed, making the register access operation quite inefficient.

SUMMARY OF THE INVENTION

It is therefore an objective of this invention to provide a new method of selecting registers, which can help reduce the number of access bits and reduce access time by rearranging the physical registers in the same mode.

In accordance with the foregoing and other objectives, the invention proposes a new method of selecting registers.

In one preferred embodiment, the method according to the invention is used for selecting registers from a primitive register set; the primitive register set including six modes of registers, including a Mode 0, a Mode 1, a Mode 2, a Mode 3, a Mode 4, and a Mode 5; wherein the Mode 0 contains 15 physical registers and one physical program counter; the Mode 1 contains 13 virtual registers, two physical registers, and one virtual program counter; the Mode 2 contains 13 virtual registers, two physical registers, and one virtual program counter; the Mode 3 contains 13 virtual registers, two physical registers, and one virtual program counter; the Mode 4 contains 13 virtual registers, two physical registers, and one virtual program counter; and the Mode 5 contains 8 virtual registers, 7 physical registers, and one virtual program counter; and wherein the selection of one of one of the 13 virtual registers and the virtual program counter in the Mode 0, the 13 virtual registers and the virtual program counter in the Mode 1, the 13 virtual registers and the virtual program counter in the Mode 2, the 13 virtual registers and the virtual program counter in the Mode 3, the 13 virtual registers and the virtual program counter in the Mode 4, and the 8 virtual registers and the virtual program counter in the Mode 5 is mapped to one of the 15 physical registers and the one physical program counter in the Mode 0.

The first preferred embodiment of the method according to the invention comprises the step of: (1) mapping the primitive register set to a converted register set; the converted register set including two converted modes of registers, including a Converted Mode 0 and a Converted Mode 1; wherein the Converted Mode 0 contains 15 physical registers and one physical program counter; and the Converted Mode 1 contains 15 physical registers and one virtual program counter; wherein the 15 physical registers in the Converted Mode 0 are mapped to the 15 physical registers in the Mode 0 of the primitive register set; the one physical program counter in the Converted Mode 0 is mapped to the one physical program counter in the Mode 0 of the primitive register set; the 15 physical registers in the Converted Mode 1 are mapped in a predetermined one-to-one correspondence to the 2 physical registers in the Mode 1 of the primitive register set, the 2 physical registers in the Mode 2 of the primitive register set, the 2 physical registers in the Mode 3 of the primitive register set, the 2 physical registers in the Mode 4 of the primitive register set, and the 7 physical registers in the Mode 5 of the primitive register set; the one virtual program counter in the Converted Mode 1 is mapped to one of the 5 virtual program counters respectively in the Mode 1, the Mode 2, the Mode 3, the Mode 4, and the Mode 5 of the primitive register set.

Next, a mode-selection bit is issued, whose value indicates the mode that contains the register to be selected; and then, a register-selection bit sequence is issued, whose value indicates the register to be selected from the selected mode. Based on these selection bits, either the Converted Mode 0 or the Converted Mode 1 is selected based on the value of the mode-selection bit; and then selecting one of the registers in the selected mode indicated by the 4-bit register-selection bit sequence.

In another preferred embodiment, the method according to the invention is used for selecting registers from a primitive register set. The primitive register set includes six modes of registers including a Mode 0, a Mode 1, a Mode 2, a Mode 3, a Mode 4, and a Mode 5; wherein the Mode 0 contains 15 physical registers and one physical program counter; the Mode 1 contains 13 virtual registers, two physical registers, and one virtual program counter; the Mode 2 contains 13 virtual registers, two physical registers, and one virtual program counter; the Mode 3 contains 13 virtual registers, two physical registers, and one virtual program counter, the Mode 4 contains 13 virtual registers, two physical registers, and one virtual program counter; and the Mode 5 contains 8 virtual registers, 7 physical registers, and one virtual program counter; and wherein the selection of one of one of the 13 virtual registers and the virtual program counter in the Mode 0, the 13 virtual registers and the virtual program counter in the Mode 1, the 13 virtual registers and the virtual program counter in the Mode 2, the 13 virtual registers and the virtual program counter in the Mode 3, the 13 virtual registers and the virtual program counter in the Mode 4, and the 8 virtual registers and the virtual program counter in the Mode 5 is mapped to one of the 15 physical registers and the one physical program counter in the Mode 0; and wherein the converted register set includes two converted modes of registers, including a Converted Mode 0 and a Converted Mode 1; wherein the Converted Mode 0 contains 15 physical registers and one physical program counter; and the Converted Mode 1 contains 15 physical registers and one virtual program counter.

The second preferred embodiment of the method according to the invention comprises the steps of: issuing a selection bit sequence which includes a first part for mode selection and a second part for register selection; if the first part of the selection bit sequence selects the Mode 0, converting it for selection of Mode 0, and then the register indicated by the second part of the selection bit sequence is mapped to one of the physical registers and physical program counter in the Converted Mode 0; if the first part of the selection bit sequence selects one of the Mode 1, the Mode 2, the Mode 3, the Mode 4, and the Mode 5, mapping it to the Converted Mode 1; and if the second part of the selection bit sequence selects one of the two physical registers in the Mode 1, the two physical registers in the Mode 2, the two physical registers in the Mode 3, the two physical register in Mode 4, or the 7 physical registers in the Mode 5, mapping it to one of the 15 physical registers in the Converted Mode 1; and if the first part of the selection bit sequence selects one of the Mode 1, the Mode 2, the Mode 3, the Mode 4, the Mode 5, and the second part thereof selects one of the 13 virtual registers and one virtual program counter in Mode 1, or one of the 13 virtual registers and one virtual program counter in Mode 2, or one of the 13 virtual registers and one virtual program counter in Mode 3, or one of the 13 virtual registers and one virtual program counter in Mode 4, or one of the 13 virtual registers and virtual program counter in Mode 5, mapping it to one of the 15 physical registers and one physical program counter in the Converted Mode 0.

Compared to the prior art, since the invention needs just to select between 2 modes from the converted register set, rather than 6 modes from the primitive register set, it needs a reduced number of bits for the selection and allows a reduced access time.

BRIEF DESCRIPTION OF DRAWINGS

The invention can be more fully understood by reading the following detailed description of the preferred embodiments, with reference made to the accompanying drawings, wherein:

FIG. 1 (PRIOR ART) shows the architecture of a primitive register set;

FIG. 4 shows the architecture of a converted register set utilized by the invention which is mapped to the primitive register set of FIG. 1.

DETAILED DESCRIPTION OF PREFERRED EMBODIMENTS

Figure 2:
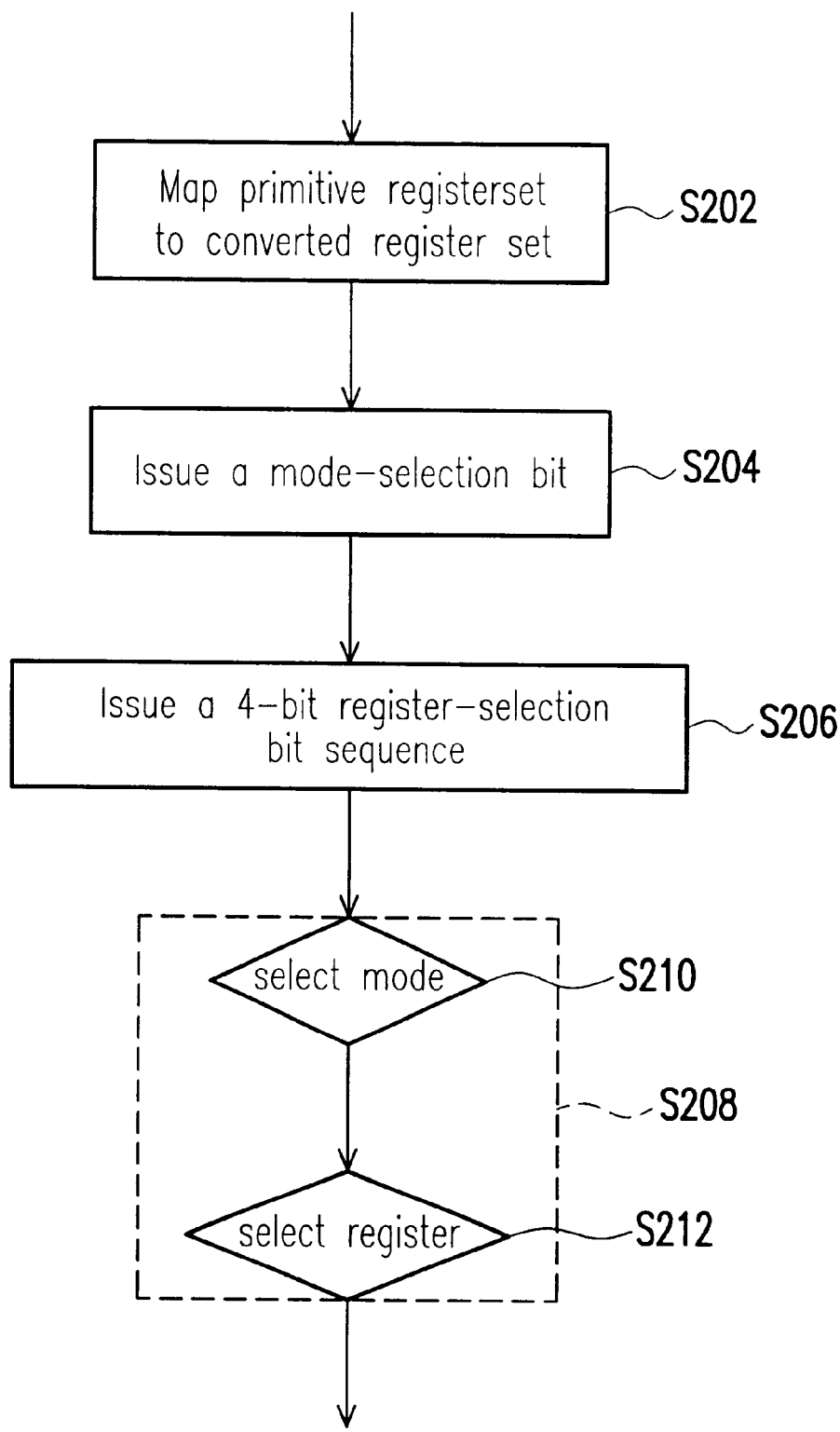
FIG. 2 is a flow diagram showing a first preferred embodiment of the method according to the invention for selecting registers.

FIG. 2 is a flow diagram showing a first preferred embodiment of the method according to the invention for selecting registers. In this example, the invention is utilized to select registers from the primitive register set shown in FIG. 1, which includes six modes: Mode 0, Mode 1, Mode 2, Mode 3, Mode 4, and Mode 5; wherein Mode 0 includes 15 physical registers R0–R14 and one physical program counter PC; Mode 1 includes 13 virtual registers R0–R12, two physical registers R13__SVC, R14__SVC, and one virtual program counter PC; Mode 2 includes 13 virtual registers R0–R12, two physical registers R13__ABORT, R14__ABORT, and one virtual program counter PC; Mode 3 includes 13 virtual registers R0–R12, two physical registers R13__UNDEF, R14__UNDEF, and one virtual program counter PC; Mode 4 includes 13 virtual registers R0–R12, two physical registers R13__IRQ, R14__IRQ, and one virtual program counter PC; Mode 5 includes 8 of virtual registers R0–R7, 7 physical registers R8__FIQ–R14__FIQ, and one virtual program counter PC. When selecting one register from the group of the virtual registers R0–R12 and virtual program counter PC in Mode 1, the virtual registers R0–R12 and virtual program counter PC in Mode 2, the virtual registers R0–R12 and virtual program counter PC in Mode 3, the virtual registers R0–R12 and virtual program counter PC in Mode 4, and the virtual registers R0–R7 and virtual program counter PC in Mode 5, the selection is mapped to one of the physical registers R0–R14 and the physical program counter PC in Mode 0. For example, when a selection is directed to the virtual register R0 in Mode 1, it will be mapped to the physical register R0 in Mode 0 and perform access to the physical register R0 in Mode 0. This mapping procedure is depicted in the flow diagram of FIG. 2.

Referring to FIG. 2, the first step S202 is to map the primitive register set to a converted register set shown in FIG. 4, which includes only two modes: Converted Mode 0 and Converted Mode 1; wherein Converted Mode 0 contains 15 physical registers R0–R14 and one physical program counter PC, while Converted Mode 1 contains another 15 physical registers R13__SVC, R14__SVC, R13__ABORT, R14__ABORT, R13__UNDEF, R14__R13__IRQ, R14__IRQ, R9__FIQ~R14__FIQ, and one virtual program counter PC. The physical registers R0~R14 and the physical program counter PC in Converted Mode 0 are respectively mapped to the physical registers R0~R14 and the physical program counter PC in Mode 0. The physical registers R13__SVC, R14__SVC, R13__ABORT, R14__ABORT, R13__UNDEF, R14__UNDEF, R13__IRQ, R14__IRQ, R9__FIQ~R14__FIQ in Converted Mode 1 are respectively mapped to the physical registers R13__SVC, R14__SVC in Mode 1, the physical registers R13__ABORT, R14__ABORT in Mode 2, the physical registers R13__UNDEF, R14__UNDEF in Mode 3, the physical registers R13__IRQ, R14__IRQ in Mode 4, and the physical registers R9__FIQ~R14__FIQ in Mode 5. The virtual program counter PC in Converted Mode 1 is mapped to either one of the virtual program counter PC in Mode 1, the virtual program counter PC in Mode 2, the virtual program counter PC in Mode 3, the virtual program counter PC in Mode 4, or the virtual program counter PC in Mode 5. It is to be noted that the mapping of the physical and virtual registers and program counters from the primitive register set to the converted register set can have various other arrangements and is not limited to the one described above.

In the next step S204, a mode-selection bit is issued, whose value determines the selection of either Converted Mode 0 or Converted Mode 1. For example, if the mode-selection bit is 0, Converted Mode 0 is selected; and if 1, Converted Mode 1 is selected.

In the next step S206, a 4-bit register-selection bit sequence is issued for the selection of one of the 16 registers in Converted Mode 0 or Converted Mode 1.

The procedure then goes to the step S208, which includes two substeps S210 and S212. In the substep S210, if the mode-selection bit is a first binary value, for example 0, Converted Mode 0 is selected; and if a second binary value, for example 1, Converted Mode 1 is selected. In the next substep S212, register selection is carried out by mapping the 4-bit register-selection bit sequence to the corresponding register. For example, if the mode-selection bit is 0 and the 4-bit register-selection bit sequence is (1111), then the physical program counter PC in Converted Mode 0 is selected.

Figure 3:
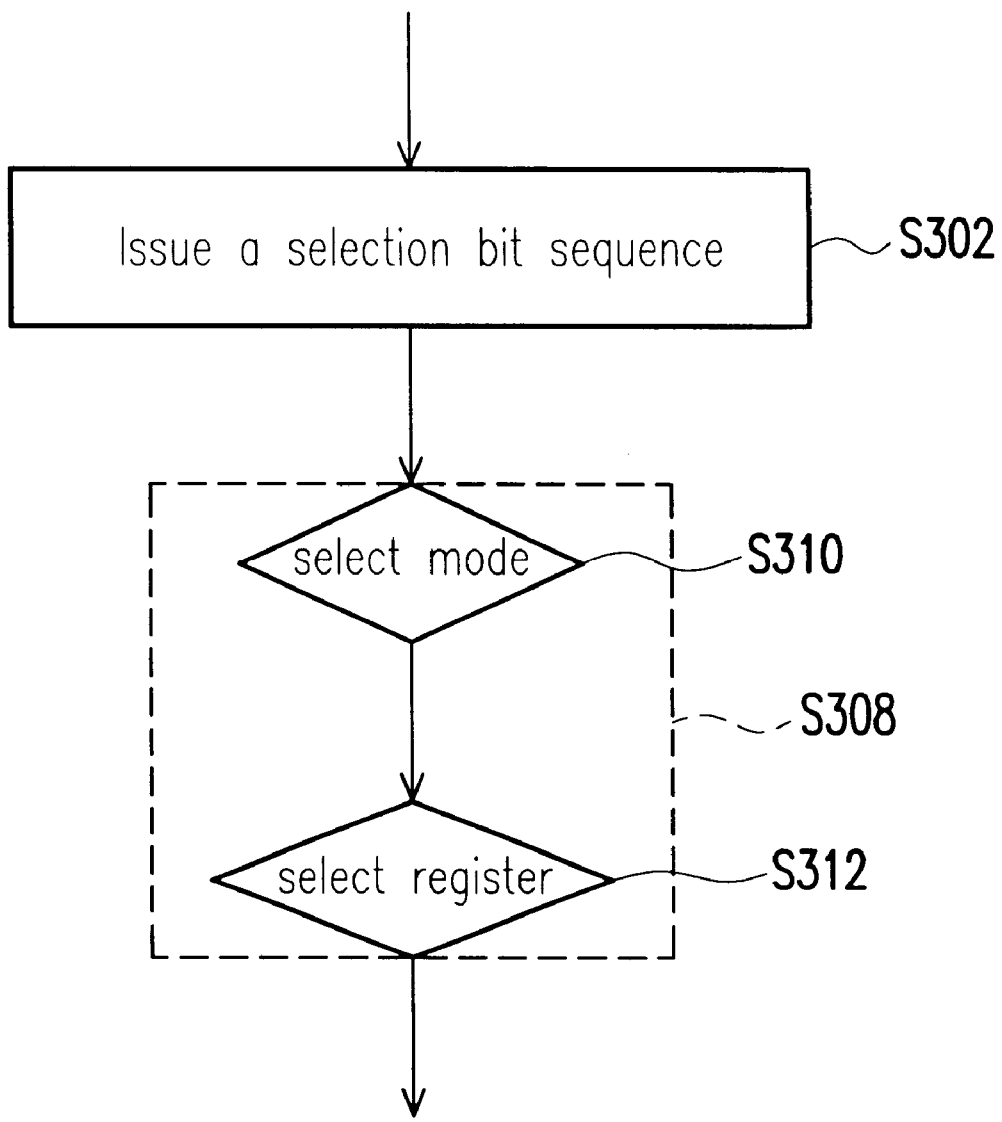
FIG. 3 is a flow diagram showing a second preferred embodiment of the method according to the invention for selecting registers.

FIG. 3 is a flow diagram showing the procedural steps of a second preferred embodiment of the method according to the invention for selecting registers. This embodiment is also directed to the primitive register set of FIG. 1 and the initial step is the same as the step S202 shown in FIG. 2.

After the primitive register set of FIG. 1 is mapped to the converted register set, the next step S302 is executed, in which a selection bit sequence is issued, which includes a first part for mode selection and a second part for register selection.

The procedure then goes to the step S30, which includes two substeps S306 and S308. In the substep S306, the first part of the selection bit sequence is used for mode selection; and then in the next substep S308, the second part of the selection bit sequence is used for register selection.

If the first part of the selection bit sequence selects Mode 0, then it is mapped to Converted Mode 0, and then the second part of the selection bit sequence is mapped to one of the physical registers R0~R14 and physical program counter PC in Converted Mode 0. For example, if the physical register R0 in Mode 0 is to be selected, it is mapped to the physical register R0 in Converted Mode 0.

If the first part of the selection bit sequence selects either Mode 1, or Mode 2, or Mode 3, or Mode 4, or Mode 5, it is mapped to Converted Mode 1; and if the second part of the selection bit sequence selects one register from the group of R13__SVC and R14__SVC in Mode 1, R13__ABORT and R14__ABORT in Mode 2, R13__UNDEF and R14__UNDEF in Mode 3, R13__IRQ and R14__IRQ in Mode 4, or R13__FIQ~R14__FIQ in Mode 5, it is mapped to one of the physical registers in Converted Mode 1. For example, if the physical register R13__SVC in Mode 1 is to be selected, it is mapped to the physical register R13__SVC in Converted Mode 0.

If the first part of the selection bit sequence selects either Mode 1, or Mode 2, or Mode 3, or Mode 4, or Mode 5, while the second part thereof selects one register from the group of the virtual registers R0~R12 and virtual program counter PC in Mode 1, the virtual registers R0~R12 and virtual program counter PC in Mode 2, the virtual registers R0~R12 and virtual program counter PC in Mode 3, the virtual registers R0~R12 and virtual program counter PC in Mode 4, the virtual registers R0~R7 and virtual program counter PC in Mode 5, it is mapped to one of the physical registers R0~R14 and physical program counter PC in Converted Mode 0. For example, if the virtual program counter PC in Mode 5 is to be selected, it is mapped to the physical program counter PC in Converted Mode 0.

Compared to the prior art, the invention needs just one bit, rather than 3 bits, for mode selection, which can help reduce the required number of access bits. Moreover, the invention can help reduce the access time by 25% as compared to the prior art. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for selecting registers from a primitive register set; the primitive register set including six modes of registers, including a Mode 0, a Mode 1, a Mode 2, a Mode 3, a Mode 4, and a Mode 5; wherein the Mode 0 contains 15 physical registers and one physical program counter; the Mode 1 contains 13 virtual registers, two physical registers, and one virtual program counter; the Mode 2 contains 13 virtual registers, two physical registers, and one virtual program counter; the Mode 3 contains 13 virtual registers, two physical registers, and one virtual program counter; the Mode 4 contains 13 virtual registers, two physical registers, and one virtual program counter; and the Mode 5 contains 8 virtual registers, 7 physical registers, and one virtual program counter; and wherein the selection of one of one of the 13 virtual registers and the virtual program counter in the Mode 0, the 13 virtual registers and the virtual program counter in the Mode 1, the 13 virtual registers and the virtual program counter in the Mode 2, the 13 virtual registers and the virtual program counter in the Mode 3, the 13 virtual registers and the virtual program counter in the Mode 4, and the 8 virtual registers and the virtual program counter in the Mode 5 is mapped to one of the 15 physical registers and the one physical program counter in the Mode 0;

the method comprising the step of:
(1) mapping the primitive register set to a converted register set; the converted register set including two converted modes of registers, including a Converted Mode 0 and a Converted Mode 1; wherein the Converted Mode 0 contains 15 physical registers and one physical program counter; and the Converted Mode 1 contains 15 physical registers and one virtual program counter;
wherein
the 15 physical registers in the Converted Mode 0 are mapped to the 15 physical registers in the Mode 0 of the primitive register set; the one physical program counter in the Converted Mode 0 is mapped to the one physical program counter in the Mode 0 of the primitive register set; the 15 physical registers in the Converted Mode 1 are mapped in a predetermined one-to-one correspondence to the 2 physical registers in the Mode 1 of the primitive register set, the 2 physical registers in the Mode 2 of the primitive register set, the 2 physical registers in the Mode 3 of the primitive register set, the 2 physical registers in the Mode 4 of the primitive register set, and the 7 physical registers in the Mode 5 of the primitive register set; the one virtual program counter in the Converted Mode 1 is mapped to one of the 5 virtual program counters respectively in the Mode 1, the Mode 2, the Mode 3, the Mode 4, and the Mode 5 of the primitive register set;
(2) issuing a mode-selection bit whose value indicates the mode that contains the register to be selected;
(3) issuing a 4-bit register-selection bit sequence whose value indicates the register to be selected from the selected mode; and
(4) selecting either the Converted Mode 0 or the Converted Mode 1 based on the value of the mode-selection bit; and then selecting one of the registers in the selected mode indicated by the 4-bit register-selection bit sequence.

2. A method for selecting registers from a primitive register set which is mapped to a converted register set; wherein the primitive register set includes six modes of registers, including a Mode 0, a Mode 1, a Mode 2, a Mode 3, a Mode 4, and a Mode 5; wherein the Mode 0 contains 15 physical registers and one physical program counter; the Mode 1 contains 13 virtual registers, two physical registers, and one virtual program counter; the Mode 2 contains 13 virtual registers, two physical registers, and one virtual program counter; the Mode 3 contains 13 virtual registers, two physical registers, and one virtual program counter; the Mode 4 contains 13 virtual registers, two physical registers, and one virtual program counter; and the Mode 5 contains 8 virtual registers, 7 physical registers, and one virtual program counter; and wherein the selection of one of the 13 virtual registers and the virtual program counter in the Mode 0, the 13 virtual registers and the virtual program counter in the Mode 1, the 13 virtual registers and the virtual program counter in the Mode 2, the 13 virtual registers and the virtual program counter in the Mode 3, the 13 virtual registers and the virtual program counter in the Mode 4, and the 8 virtual registers and the virtual program counter in the Mode 5 is mapped to one of the 15 physical registers and the one physical program counter in the Mode 0; and wherein the converted register set includes two converted modes of registers, including a Converted Mode 0 and a Converted Mode 1; wherein the Converted Mode 0 contains 15 physical registers and one physical program counter; and the Converted Mode 1 contains 15 physical registers and one virtual program counter;

the method comprising the steps of:
(1) issuing a selection bit sequence which includes a first part for mode selection and a second part for register selection;
(2) if the first part of the selection bit sequence selects the Mode 0, converting it for selection of Mode 0, and then the register indicated by the second part of the selection bit sequence is mapped to one of the physical registers and physical program counter in the Converted Mode 0;
(3) if the first part of the selection bit sequence selects one of the Mode 1, the Mode 2, the Mode 3, the Mode 4, and the Mode 5, mapping it to the Converted Mode 1; and if the second part of the selection bit sequence selects one of the two physical registers in the Mode 1, the two physical registers in the Mode 2, the two physical registers in the Mode 3, the two physical register in Mode 4, or the 7 physical registers in the Mode 5, mapping it to one of the 15 physical registers in the Converted Mode 1; and
(4) if the first part of the selection bit sequence selects one of the Mode 1, the Mode 2, the Mode 3, the Mode 4, the Mode 5, and the second part thereof selects one of the 13 virtual registers and one virtual program counter in Mode 1, or one of the 13 virtual registers and one virtual program counter in Mode 2, or one of the 13 virtual registers and one virtual program counter in Mode 3, or one of the 13 virtual registers and one virtual program counter in Mode 4, or one of the 13 virtual registers and virtual program counter in Mode 5, mapping it to one of the 15 physical registers and one physical program counter in the Converted Mode 0.

3. The method of claim 2, wherein the 15 physical registers in the Converted Mode 0 are mapped to the 15 physical registers in the Mode 0 of the primitive register set; the one physical program counter in the Converted Mode 0 is mapped to the one physical program counter in the Mode 0 of the primitive register set; the 15 physical registers in the Converted Mode 1 are mapped in a predetermined one-to-one correspondence to the 2 physical registers in the Mode 1 of the primitive register set, the 2 physical registers in the Mode 2 of the primitive register set, the 2 physical registers in the Mode 3 of the primitive register set, the 2 physical registers in the Mode 4 of the primitive register set, and the 7 physical registers in the Mode 5 of the primitive register set; the one virtual program counter in the Converted Mode 1 is mapped to a selected one from the group consisting of the 5 virtual program counters respectively in the Mode 1, the Mode 2, the Mode 3, the Mode 4, and the Mode 5 of the primitive register set.

4. A method for selecting registers from a primitive register set including a number of modes of physical registers and virtual registers;

the method comprising the step of:
(1) mapping the primitive register set to a converted register set; the converted register set including a reduced number of modes of physical registers and virtual registers that are mapped to the physical registers and virtual registers in a predetermined correspondence;
(2) issuing a bit sequence indicating the mode and register to be selected from the primitive register set;
(3) issuing a bit sequence indicating the mode and register to be selected from the primitive register set;
(4) mapping the mode in the primitive register set indicated by the bit sequence to the corresponding mode in the converted register set;
(5) mapping the register in the primitive register set indicated by the bit sequence to the corresponding register in the converted register set.

5. The method of claim 4, wherein the primitive register set including six modes of registers, including a Mode 0, a Mode 1, a Mode 2, a Mode 3, a Mode 4, and a Mode 5; wherein the Mode 0 contains 15 physical registers and one physical program counter; the Mode 1 contains 13 virtual registers, two physical registers, and one virtual program counter; the Mode 2 contains 13 virtual registers, two physical registers, and one virtual program counter; the Mode 3 contains 13 virtual registers, two physical registers, and one virtual program counter; the Mode 4 contains 13 virtual registers, two physical registers, and one virtual program counter; and the Mode 5 contains 8 virtual registers, 7 physical registers, and one virtual program counter; and wherein the selection of one of the 13 virtual registers and the virtual program counter in the Mode 0, the 13 virtual registers and the virtual program counter in the Mode 1, the 13 virtual registers and the virtual program counter in the Mode 2, the 13 virtual registers and the virtual program counter in the Mode 3, the 13 virtual registers and the virtual program counter in the Mode 4, and the 8 virtual registers and the virtual program counter in the Mode 5 is mapped to one of the 15 physical registers and the one physical program counter in the Mode 0;

and wherein
the converted register set includes two converted modes of registers, including a Converted Mode 0 and a Converted Mode 1; wherein the Converted Mode 0 contains 15 physical registers and one physical program counter; and the Converted Mode 1 contains 15 physical registers and one virtual program counter; the 15 physical registers in the Converted Mode 0 are mapped to the 15 physical registers in the Mode 0 of the primitive register set; the one physical program counter in the Converted Mode 0 is mapped to the one physical program counter in the Mode 0 of the primitive register set; the 15 physical registers in the Converted Mode 1 are mapped in a predetermined one-to-one correspondence to the 2 physical registers in the Mode 1 of the primitive register set, the 2 physical registers in the Mode 2 of the primitive register set, the 2 physical registers in the Mode 3 of the primitive register set, the 2 physical registers in the Mode 4 of the primitive register set, and the 7 physical registers in the Mode 5 of the primitive register set; the one virtual program counter in the Converted Mode 1 is mapped to one of the 5 virtual program counters respectively in the Mode 1, the Mode 2, the Mode 3, the Mode 4, and the Mode 5 of the primitive register set.

\* \* \* \* \*